(12) United States Patent
Choi et al.

(10) Patent No.: US 11,427,471 B2
(45) Date of Patent: Aug. 30, 2022

(54) METHOD FOR PREPARING CARBON MATERIAL USING POLYOLEFIN-BASED PLASTIC AND CARBON MATERIAL PREPARED THEREFROM

(71) Applicant: KOREA INSTITUTE OF SCIENCE AND TECHNOLOGY, Seoul (KR)

(72) Inventors: Dalsu Choi, Jeollabuk-do (KR); Dawon Jang, Jeollabuk-do (KR); Sung Ho Lee, Jeollabuk-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 482 days.

(21) Appl. No.: 16/188,294

(22) Filed: Nov. 13, 2018

(65) Prior Publication Data
US 2019/0144279 A1    May 16, 2019

(30) Foreign Application Priority Data
Nov. 14, 2017    (KR) ........................ 10-2017-0151596

(51) Int. Cl.
*C01B 32/05*   (2017.01)
*C08J 3/14*    (2006.01)
*C08J 11/12*   (2006.01)

(52) U.S. Cl.
CPC ................. *C01B 32/05* (2017.08); *C08J 3/14* (2013.01); *C08J 11/12* (2013.01); *C08J 2323/06* (2013.01)

(58) Field of Classification Search
None
See application file for complete search history.

(56) References Cited

U.S. PATENT DOCUMENTS

| 5,744,668 A | 4/1998 | Zhou et al. |
| 5,961,946 A | 10/1999 | Takegawa et al. |

(Continued)

FOREIGN PATENT DOCUMENTS

| JP | 1997208738 A | 8/1997 |
| JP | 2004-532922 A * | 10/2004 |

(Continued)

OTHER PUBLICATIONS

D.S. Achilias, et al. Recycling Techniques of Polyolefins from Plastic Wastes, Global NEST Journal, vol. 10, No. 1, p. 114-122, 2008 (Year: 2008).*

(Continued)

*Primary Examiner* — Mohammad M Ameen
(74) *Attorney, Agent, or Firm* — Cantor Colburn LLP

(57) ABSTRACT

Provided are a method for preparing a carbon material using a polyolefin-based plastic, which includes a step of dissolving a polyolefin-based plastic in a solvent and then precipitating to obtain a polyolefin-based polymer having, for example, a powder or film shape, a step of crosslinking and cyclizing the precipitated polyolefin-based polymer to stabilize the polyolefin-based polymer and to cleave linear bonding of the polyolefin-based polymer, and a step of carbonizing the stabilized polyolefin-based polymer and a carbon material prepared according to this method. According to this method, it is possible to convert polyolefin-based plastics, particularly polyolefin-based waste plastics, into high-quality carbon materials having high heat-generating properties and a high electrical conductivity by a simple and efficient process.

12 Claims, 13 Drawing Sheets

(56) References Cited

U.S. PATENT DOCUMENTS

| | | |
|---|---|---|
| 9,340,427 B2 | 5/2016 | Kim et al. |
| 9,409,781 B2 | 8/2016 | Joh et al. |
| 2008/0318056 A1* | 12/2008 | Vilkki ............... C08J 3/24 428/420 |
| 2013/0087552 A1* | 4/2013 | Lee ............... D06M 11/74 219/553 |
| 2016/0039680 A1 | 2/2016 | Jacob |
| 2016/0348283 A1* | 12/2016 | Jo ............... D01F 9/225 |
| 2017/0352870 A1* | 12/2017 | Alcoutlabi ............ H01M 4/625 |

FOREIGN PATENT DOCUMENTS

| | | |
|---|---|---|
| JP | 2004532922 A | 10/2004 |
| KR | 1019830006258 A | 9/1983 |
| KR | 100202089 B1 | 6/1999 |
| KR | 100214916 B1 | 8/1999 |
| KR | 1020030070874 A | 9/2003 |
| KR | 2003-0070874 * | 9/2006 |
| KR | 101425376 B1 | 8/2014 |
| KR | 101427818 B1 | 8/2014 |
| KR | 1020160138775 A | 12/2016 |
| KR | 10-2017-0077612 A * | 7/2017 |
| KR | 1020170077612 A | 7/2017 |
| WO | 2015026294 A1 | 2/2015 |

OTHER PUBLICATIONS

D. Sarangi et al., "Carbon nanotubes and nanostructures grown fromdiamond-like carbon and polyethylene", Applied Physics A, 2001, pp. 765-768, vol. 73.

Guo et al., "Synthesis of Ultrafine Carbon Black by Pyrolysis of Polymers Using a Direct Current Thermal Plasma Process", Plasma Chem Plasma Process, 2010, pp. 75-90, vol. 30.

Marcus A. Hunt et al., "Patterned Functional Carbon Fibers from Polyethylene", Advanced Materials, 2012, pp. 2386-2389, vol. 24.

Vilas Ganpat Pol, "Upcycling: Converting Waste Plastics into Paramagnetic, Conducting, Solid, Pure Carbon Microspheres", Environmental Science & Technology, 2010, pp. 4753-4759, vol. 44, No. 12, American Chemical Society.

* cited by examiner

METHOD FOR PREPARING CARBON MATERIAL USING POLYOLEFIN-BASED PLASTIC AND CARBON MATERIAL PREPARED THEREFROM

CROSS-REFERENCE TO RELATED APPLICATION

This application claims the priorities of Korean Patent Application No. 10-2017-0151596, filed on Nov. 14, 2017, and all the benefits accruing therefrom under 35 U.S.C. § 119, the contents of which in their entirety are herein incorporated by reference.

BACKGROUND

1. Field

The present invention relates to a method for preparing a carbon material using a polyolefin-based plastic and a carbon material prepared therefrom, more particularly, it relates to a method for preparing a low-cost and high-quality carbon material at a high yield using a polyolefin-based plastic and a carbon material prepared therefrom.

2. Description of the Related Art

Among the plastics used in everyday life, the most frequently used polymers are polyolefin-based polymers, and the polyolefin-based polymers are used in a variety of products such as food containers, detergent containers, envelopes, wire coatings, agricultural films, disposable kitchen utensils, and the like. For example, LLDPE among polyolefins is one of the most widely used plastics in the world and is the third most produced after polypropylene (PP) and high-density polyethylene (HDPE).

Unlike other plastics (PET and the like), which are used in great amounts, polyolefin-based plastics are relatively weak in strength but have excellent processability, are inexpensive, and are thus used as applied products having a short service life. Hence, polyolefin-based plastics are one of the most discarded plastic polymers, and the methods for recycling polyolefin-based polymers have been seriously discussed and the policy therefor has been made globally.

The methods of disposal of waste plastics may be roughly divided into landfilling, incineration, energy recycling method, and material recycling method.

The material recycling method varies depending on the plastic resin, and the collected waste plastics are separated, sorted, pulverized, washed, reseparated, dried, and then extruded into pellets. The recycled plastics formed in pellets are produced as recycled plastic products through an injection or extrusion process depending on the application. Recycled plastics have a disadvantage of being inferior to ordinary plastic materials which have not been recycled in the physical properties, and the recycled plastics are thus used in mixture with ordinary plastic materials depending on the application in some cases.

Recycling in a real sense may be the material recycling described above, but the material recycling method occupies less than 30% of the actual methods of disposal of waste plastics.

The next most significant method of disposal is energy recycling method. Plastic polymers are chemical products produced from petroleum and thus can provide energy when being burned. Thus, the most common energy recycling method is to use waste plastics as raw materials for thermal power plants to produce energy. In other words, it can be said that waste plastics are converted into fuel, and a technology to directly burn waste plastics or to convert the waste plastics into solid fuel is common.

Solid fuel is produced by sorting, drying, pulverizing and then mixing plastics with additives such as limestone, and processing the mixture into pellets. Direct combustion is a form to be used in a large-scale facility such as a power plant, but fuel produced as solid fuel can be used in paper mill, dyeing factory, food factory, and the like. However, solid fuel has a disadvantage that it requires a dedicated boiler and the heating value thereof is not uniform. Recently, a liquidation reduction method is known in which oil is extracted from waste plastics using heat and a catalyst. However, such a liquidation reduction method is not yet highly profitable, and it is expected to take time to commercialize the method because of a technical problem. In the European Union, conversion of waste plastics into fuel accounts for about 36% of the total methods of disposal of waste plastics.

The material recycling method or energy recycling method described above can be used in a case in which the separate collection is well performed or sorting is easily performed after collection. However, waste plastics which have not been separately collected or sorted are actually discarded by simple incineration or landfilling in number of cases.

In fact, as of 2012, 38% of waste plastics is landfilled in the European Union (EU). In addition, recycling is possible in some developed countries in the world, and waste plastics are discarded by landfilling and incineration in most countries.

Such landfilling of waste plastics causes serious air and soil pollution. Efforts are being thus made to diminish use of plastics causing environmental problems, but use of plastics, which is practically convenient, is not practically decreased. Hence, in the European Union (EU), research is under way to announce and implement the ban on landfilling of plastic waste from 2025.

In Korea, separate collection of waste plastics is well done through the separate collection of household garbage, but due to the problem of profitability and lack of technology, only 49% of 4.5 million tons of waste plastics is recycled as materials and energy as of 2008. In Japan, material recycling accounts for 22% and energy recycling accounts for 56% as of 2011.

Among waste plastics, polyolefin-based waste plastics are discarded by 3.13 million tons in Japan as of 2011. This accounts for 33% of the total waste plastic resins. However, only 340,000 tons thereof is recycled, and the recycling rate of polyolefin-based waste plastics is thus only 11%. The proportion of polyolefin-based plastics accounts for about 34% to be a great amount among the general-purpose plastics used in Korea.

In the case of plastic bottles, as PET is an object item of deposit-refund, the recycling business thereof is active, and the recycling rate thereof is thus relatively high. Unlike PET, the separate collection rate and recycling rate of polyolefin-based resins are low. Waste polyolefin-based plastics with good condition are compression-molded and recycled as septic tanks, containers of agricultural chemicals, basins, and the like. However, rural polyolefin films used in green houses, food packaging, envelopes, and the like are buried together with other household garbage.

Limitations of waste plastic recycling industry include the problems that the products produced using waste plastics as raw materials is often inferior to the products produced from clean new raw materials in performance and the profitability is low because of sorting process and the like. Hence, researches are being recently conducted on the technologies for upcycling to produce products with high added value rather than simple recycling.

As a representative example thereof, polyolefin-based waste plastics may be used as a raw material of carbon nanotubes. Polyolefins are decomposed when being heated at 500° C. or more, and a technology has been developed in which spherical carbon materials having a diameter of several micrometers are produced while a pressure of 1000 psi or more is generated when polyolefin-based waste plastics are placed in a reactor and heated at 700° C. or more. In addition, a method has also been developed in which polyolefin-based waste plastics are heated at a temperature of 700° C. or more to generate carbon gas and the carbon gas is introduced onto the surface of a catalyst to grow carbon nanotubes.

However, these methods have a low yield and use of the materials is limited since the materials have a micrometer size. Hence, more efficient process technology is required when it is attempted to upcycle waste plastics by converting the waste plastics into carbon materials.

SUMMARY

In exemplary embodiments of the present invention, in an aspect, it is aimed to provide a method for preparing a carbon material using a polyolefin-based plastic, by which it is possible to simply and efficiently prepare a carbon material using a polyolefin-based plastic by a non-catalytic process through precipitation, stabilization, and carbonization.

In exemplary embodiments of the present invention, in another aspect, it is aimed to provide a high-quality carbon material which is prepared using a polyolefin-based plastic and has excellent heat-generating properties and an excellent electrical conductivity.

In exemplary embodiments of the present invention, there is provided a method for preparing a carbon material using a polyolefin-based plastic, which includes a step of dissolving a polyolefin-based plastic in a solvent and then precipitating to obtain a polyolefin-based polymer having, for example, a powder or film shape; a step of crosslinking and cyclizing the precipitated polyolefin-based polymer to stabilize the polyolefin-based polymer and to cleave linear bonding of the polyolefin-based polymer; and a step of carbonizing the stabilized polyolefin-based polymer.

In exemplary embodiments of the present invention, there is provided a carbon material which is prepared by the preparation method described above and in which one or more layers of structural planes having aligned hexagonal carbon atom rings are layered.

According to exemplary embodiments of the present invention, it is possible to convert polyolefin-based plastics, particularly polyolefin-based waste plastics, into a high-quality carbon material having high heat-generating properties and a high electrical conductivity at a high yield of, for example, 50% by a simple and efficient process. Such a high conversion yield is, for example, a yield that can be obtained from PAN, which is a typical representative polymer precursor.

In addition, according to exemplary embodiments of the present invention, it is easy to control the electrical properties of a carbon material depending on the heat treatment temperature.

In addition, the carbon material prepared according to exemplary embodiments of the present invention has superior electrical conductivity properties and superior heat-generating properties to the carbon material obtained from PAN, which is a typical representative polymer precursor, or Super-p.

The reason why the carbon material prepared according to exemplary embodiments of the present invention has a higher electrical conductivity than a PAN polymer, from which a carbon material is prepared, is the structure. Polymer materials undergo a stabilization process to form an insolubilized structure capable of withstanding heat before the carbonization process of producing a carbon material. In the case of PAN as well, the stabilization process is essential. A linear polymer structure is changed into a ladder structure through the stabilization process. The chain structure includes a hexagonal ring structure to be the basis of the carbon structure, and the carbon structure is more easily developed after carbonization as the ring structure is more favorably formed. In exemplary embodiments of the present invention, particularly the linear structure of polyolefin is cleaved at the time of stabilization of polyolefin. Hence, in the properties after carbonization and graphitization, a polyolefin of which the linear structure is cleaved has a high electrical conductivity and from which a graphite structure is also easily developed unlike the case of a polyolefin or PAN of which the linear structure is not cleaved. It is preferable that such cleavage of the linear structure of a polyolefin includes at least the heat treatment process described above. In other words, it is preferable that the stabilization includes the heat treatment process singly or at least a heat treatment by conducting the heat treatment and an electron beam treatment concurrently or the heat treatment and a sulfur treatment concurrently.

More specifically, the mechanical properties of a polyolefin decrease when the linear structure thereof is modified. However, in exemplary embodiments of the present invention, a process of preparing a carbon material is added after carbonization and thus a decrease in the properties of polyolefin after stabilization is not of interest. Rather, in exemplary embodiments of the present invention, when a long linear structure is cleaved and short chains are formed, the short chains may have a ladder structure through crosslinking, oxidation, and the like and a stabilization reaction may take place.

It is easier to form a hexagonal cyclized cluster having a relatively small size, namely, a basic structural unit (BSU) of carbon structure from a short linear structure than from a long linear structure. The size of the basic structural unit generated through the stabilization process can be observed by Raman spectroscopy. The basic structural unit having a small size easily moves during the subsequent carbonization process, can be smoothly self-assembled, and as a result, is easily developed into a crystalline carbon structure.

This results in improved electrical conductivity properties due to the crystalline carbon structure after the carbonization process. On the other hand, a much larger hexagonal ring cluster is formed in the case of a polyolefin of which the linear structure is not cleaved or the case of PAN of which the linear structure is not cleaved as much as the polyolefin during the stabilization process. As a result, self-assembly during the carbonization process does not smoothly proceed and it is thus difficult to develop a crystalline carbon structure. Hence, the electrical conductivity thereof is lower than that of the carbon material prepared based on the polyolefin after carbonization. It is possible to confirm a structure in the form of a dot when the structure of the carbon material prepared from the polyolefin is observed under a microscope. It is possible to confirm that the generated dot is a more developed structure than the surrounding carbon when the degree of structure development of the generated dot is observed by Raman spectroscopy.

As the carbon structure is more developed, it is possible to observe that the intensity of 2 bands in the graph attained by Raman spectroscopy increases. It is possible to observe a 2D band having a higher intensity from the dot when the dot and its surroundings are observed by Raman spectroscopy. As a result, in a case in which carbon materials are prepared using polyolefin polymers rather than PAN polymers, the hexagonal ring structure is more easily generated in the stabilization process, thus much more developed carbon dots are obtained after carbonization and an effect of increasing the electrical conductivity of the entire carbon material is obtained. Consequently, the carbon material according to exemplary embodiments of the present invention can be usefully used as an inexpensive high-quality material for an energy storage device including a lithium ion secondary battery or the like or a flexible printing electronic instrument.

BRIEF DESCRIPTION OF THE DRAWINGS

The above and other aspects, features and advantages of the disclosed example embodiments will be more apparent from the following detailed description taken in conjunction with the accompanying drawings in which.

DETAILED DESCRIPTION

Figure 1A:
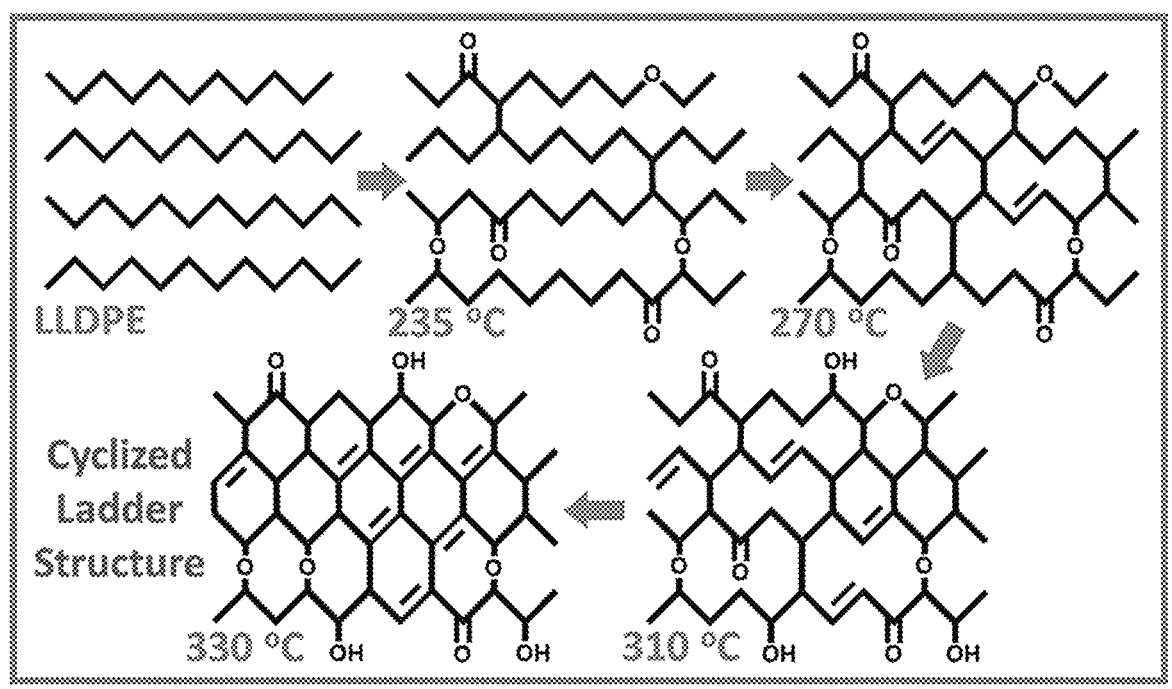
FIG. 1A is a schematic diagram illustrating crosslinking and cyclization of LLDPE, which is a polyolefin, in an embodiment of the present invention.

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose example embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another. Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the present invention will be described in detail.

In the present specification, the carbon material is not limited as long as the carbon atoms have a ring arrangement. The carbon atoms preferably have a hexagonal ring arrangement. Such a carbon material may be selected from, for example, graphene having a two-dimensional structure, graphite having a three-dimensional structure, or fullerene having a zero-dimensional structure.

Among these carbon materials, high-quality carbon materials are composed of well-packed hexagonal ladder planes, and excellent mechanical and electrical properties and thermal and chemical stabilities are imparted by aligned layering of the planes through long-range conjugation and $\pi$-$\pi$ interaction.

In the present specification, polyolefin-based plastics are meant to include plastics containing polyolefin-based polymers or composite plastics containing such polyolefin-based plastics.

In addition, the polyolefin-based waste plastics are meant to include waste plastics containing polyolefin-based polymers or composite waste plastics containing such polyolefin-based waste plastics.

The composite plastics or the composite waste plastics may further contain synthetic rubber in addition to polyolefin-based polymers.

In the present specification, stabilization means to allow a polymer to be insolubilized before carbonization.

In exemplary embodiments of the present invention, a method for preparing a carbon material using a polyolefin-based plastic, which includes a step of dissolving a polyolefin-based plastic in a solvent and then precipitating to obtain a polyolefin-based polymer having, for example, a powder or film shape; a step of crosslinking and cyclizing the precipitated polyolefin-based polymer to stabilize the polyolefin-based polymer; and a step of carbonizing the stabilized polyolefin-based polymer and a carbon material prepared according to this method are provided.

In an exemplary embodiment, the polyolefin-based plastic is preferably a polyolefin-based waste plastic.

According to the method for preparing a carbon material described above, it is possible to simply and efficiently prepare a carbon material having excellent performance using a polyolefin-based plastic, particularly a polyolefin-based waste plastic, through a non-catalytic process in which a metal catalyst is not used.

The shape of the carbon material prepared is not limited, and the carbon material prepared may have, for example, a powder shape. At this time, the powdery carbon material may preferably have a size of several micrometers (μm). In addition, the carbon material may be ground after being prepared to adjust the size of the powder.

In an exemplary embodiment, the polyolefin-based resin contained in the polyolefin-based plastic or polyolefin-based waste plastic includes, for example, a linear low-density polyolefin (LLDPE), a low-density polyolefin (LDPE), a medium-density polyolefin (MDPE), a high-density polyolefin (HDPE), an ultra high molecular weight polyolefin (UHMWPE), and a crosslinked polyolefin (XLPE).

In a non-limiting example, the waste plastics composed of the linear low-density polyolefin (LLDPE) may be, for example, a waste cling wrap or a waste poly glove used in the home as to be described later.

Hereinafter, the respective steps will be described in detail.

Step of Preparing Polymer Precursor

A precursor in the form of a powder or film is prepared using a polyolefin-based plastic, for example, a polyolefin-based waste plastic collected.

In an exemplary embodiment, the polyolefin-based plastic is placed in a solvent which can dissolve the plastic, for example, a hydrocarbon, chlorinated hydrocarbon, or aromatic hydrocarbon solvent (trichloroethane, toluene, xylene, dichlorobenzene, trichlorobenzene, tetrahydronaphthalene, decahydronaphthalene, or the like) and heated.

At this time, the heating temperature is not set to one since the dissolution temperature varies depending on the kinds of plastic and solvent.

A polyolefin is precipitated in the form of a powder or film at the bottom of a glass vessel containing the solution when the solution is cooled to room temperature after the polyolefin-based plastic is completely dissolved. Substances other than the polyolefin-based polymer among the substances contained in the polyolefin-based plastic can be removed through such a precipitation process.

The precipitate obtained is separated from the solution and dried to obtain a polyolefin-based plastic powder or film. As a matter of course, the plastic powder or film obtained may be secondarily processed into the form of a film and then used in the subsequent process.

In an exemplary embodiment, a crosslinking agent may be added to the solvent when the polyolefin-based plastic is added to the solvent and these may be dissolved at the same time. Such a crosslinking agent can promote the crosslinking in the stabilization step of the next step.

At this time, the crosslinking agent may be used in a range of from 0.5 to 5 parts by weight with respect to 100 parts by weight of the polyolefin-based plastic. The crosslinking reaction does not take place when the amount of the crosslinking agent is too small, and the mechanical and physical properties of the polyolefin-based polymer may be impaired when the amount of the crosslinking agent is too great. In addition, the crosslinking agent becomes a foreign material when conversion of the polyolefin-based polymer into a carbon material is taken into consideration, and the carbonization yield may be thus lowered.

In an exemplary embodiment, the crosslinking agent includes, but is not limited to, an organic peroxide. The organic peroxide may be butyl 4,4-bis(tert-butyldioxy)valerate, di-(2,4-dichlorobenzoyl)-peroxide, dibenzoyl peroxide, tert-butyl peroxybenzoate, 1,1-di-(tert-butylperoxy)-3,3,5-trimethylcyclohexane, dicumyl peroxide, di-(2-tert-butylperoxyisopropyl)-benzene, tert-butyl cumyl peroxide, 2,5-dimethyl-2,5-di-(tert-butylperoxy)-hexane, di-tert-butylperoxide, or 2,5-dimethyl-2,5-di(tert-butylperoxy)hexyme-3.

Meanwhile, more preferably, a mixture in which the polyolefin-based polymer powder or film itself contains a crosslinking agent may be selected, and such a polyolefin-based polymer containing a crosslinking agent is a crosslinked polyolefin (XLPE).

Step of stabilization through crosslinking and cyclization

FIG. 1A is a schematic diagram illustrating crosslinking and cyclization of LLDPE, which is one of polyolefins, in an embodiment of the present invention.

As illustrated in FIG. 1A, the polyolefin resin in the form of a powder or film obtained by precipitation from a polyolefin resin undergoes an oxidation reaction at, for example, around 330° C. and is thus stabilized while having a cyclized ladder structure in which the aliphatic chain is cyclized. Such a cyclized ladder structure contains carbon, hydrogen, and oxygen but does not contain nitrogen. After stabilization, the polyolefin resin contains carbon, hydrogen and oxygen at from 75 to 85 at % (atomic %), from 3 to 8 at % (atomic %), and from 7 to 22 at % (atomic %), respectively, and for example, it may contain carbon at 80 at %, hydrogen at 5 at %, and oxygen at 15 at %. Such crosslinking decreases the endothermic peak, which indicates the melting point of the polyolefin, in the differential scanning calorimetric analysis.

The stabilization may be conducted through a thermal treatment, a physical treatment and/or a chemical treatment.

In an exemplary embodiment, the stabilization may be preferably conducted by a process including one or more selected from the following processes (a) to (c), and it is preferable to composite two or more processes.

(a) A process of subjecting a polyolefin-based polymer powder or film which contains or does not contain a crosslinking agent to a heat treatment for stabilization in an air or oxygen atmosphere at a temperature of 400° C. or less, for example, from 200° C. to 350° C. or from 130° C. to 350° C.

(b) A process of treating a polyolefin-based polymer powder or film which contains or does not contain a crosslinking agent with an acid solution.

(c) A process of treating a polyolefin-based polymer powder or film which contains or does not contain a crosslinking agent with one or more physical means selected from plasma, an ion beam, radiation, ultraviolet light, a microwave, or an electron beam.

First, the process (a) (process of stabilization through heat treatment) is conducted under an air or oxygen atmosphere. For reference, it is possible to conduct the thermal stabilization treatment in the above-described process (a) in air or oxygen atmosphere, but it is possible to conduct the acid treatment in the process (b) or the physical treatment in the process (c) in any atmosphere.

In the process (a), the heat treatment temperature is equal to or higher than the temperature capable of inducing the cyclization of carbon atoms and equal to or lower than the carbonization temperature.

Specifically, the polyolefin-based polymer powder or film may be pyrolyzed before the stabilization (crosslinking and cyclization) thereof is induced when the heat treatment temperature is more than 400° C. to be too high at this time, and the heat treatment temperature is thus set to a temperature of 400° C. or less, for example, from 130° C. to 350° C. The stabilization (crosslinking) may not be properly conducted when the heat treatment temperature is less than 130° C. to be too low, and the properties of the carbon material may thus decrease.

The heat treatment temperature may be more preferably set to be in a range of from 150° C. to 330° C.

In an exemplary embodiment, the heat treatment in the process (a) is not particularly limited but may be conducted for, for example, from 1 to 24 hours.

In an exemplary embodiment, the polyolefin powder or film may be stabilized through a heat treatment using thermal energy singly or in combination with plasma at atmospheric pressure or in a vacuum at the time of stabilization through a heat treatment.

In an exemplary embodiment, the polyolefin powder or film may be stabilized in an oxidizing atmosphere (air atmosphere) containing oxygen or in a vacuum in a temperature range of from 130° C. to 350° C. for from 30 minutes to 480 minutes using thermal energy singly or in combination with plasma.

The process (b) (process of stabilization through acid treatment) is conducted by a method in which the polymer is impregnated with an acid solution. Here, the acid solution may include a hydrochloric acid solution, a nitric acid solution, a sulfuric acid solution, and any mixture of these solutions.

In an exemplary embodiment, the process (b) may be conducted by impregnating the polyolefin resin powder or film with an aqueous acid solution at room temperature for 10 hours. The process (b) may also be conducted by a method in which the polyolefin resin powder or film is impregnated with an aqueous acid solution at 80° C. or more for from 1 to 4 hours.

The chemical stabilization reaction of the polymer is induced by such impregnation with an acid solution, and thus crosslinking and cyclization proceeds.

In a non-limiting example, the process (b) may be to impregnate the polyolefin resin powder or film with a 90% or more aqueous solution of sulfuric acid at from 90° C. to 150° C. or from 90° C. to 100° C. for from 1 to 4 hours. The reaction proceeds fast when the temperature is high, and thus the treatment time may be shortened. However, there is a disadvantage that harmful sulfuric acid gas is severely generated when the temperature exceeds 100° C.

In an exemplary embodiment, the sulfur content in the stabilized polyolefin-based polymer may be more than 0 and 5 at % (atomic %) or less. Sulfur is used for crosslinking, but the relative proportion of the carbon element decreases as the sulfur content increases, and thus the yield after the final carbonization may decrease. For reference, most of sulfur disappears after carbonization but a part thereof may remain.

The process (c) (process of stabilization through physical treatment) may be conducted by applying one or more physical means selected from plasma, an ion beam, radiation, ultraviolet light, a microwave, or an electron beam to the polymer. The treatment conditions such as wavelength and output of the physical means listed above and the treatment time are selected so as to induce the stabilization reaction.

In the stabilization process as described above, the polymer chains have a net structure (cyclized structure) through crosslinking and are stabilized so as not to break in the high temperature carbonization process. Moreover, it is possible to prepare a carbon material having high physical, chemical and electrical properties after carbonization.

In a non-limiting example, a primarily stabilized precursor having improved heat resistance can be obtained when the polyolefin powder or film which preferably contains or does not contain a crosslinking agent is crosslinked by electron beam irradiation.

In a non-limiting example, it is preferable that the total energy by electron beam irradiation is from 50 to 3000 kGy and the electron beam irradiation is conducted in a temperature range of room temperature or more and 300° C. or less in the air.

In a non-limiting example, in the process (c), for example, an ion beam may be used instead of an electron beam and the polymer may be irradiated at about from 100 to 5000 kGy in the case of an ion beam.

In a non-limiting example, the process (c) may be conducted by irradiating the polymer with ultraviolet light and the polymer may be irradiated with ultraviolet light, for example, for from 10 minutes to 5 hours.

In addition, in a non-limiting example, a primarily stabilized precursor having improved heat resistance can be obtained when the polyolefin powder or film which preferably contains or does not contain a crosslinking agent is crosslinked by a sulfuric acid treatment.

In addition, in a non-limiting example, it is particularly preferable that the powder or film, which is preferably the primarily stabilized precursor, is stabilized through additional crosslinking using heat energy singly or in combination with plasma. One that is thus stabilized through additional crosslinking may be named a secondarily stabilized precursor.

In an exemplary embodiment, the density of the stabilized polyolefin-based polymer powder or film may be from 1.2 to 1.6 g/cm$^3$. For example, the density can be increased to 1.6 g/cm$^3$ using the above-mentioned acid solutions of sulfuric acid and the like. The fact that the density exceeds this range means that the stabilization has excessively proceeded, and the carbonization yield decreases as described above.

Carbonization Step

After the stabilization reaction is induced as described above, the stabilized polyolefin powder or film is carbonized.

The carbonization may be conducted in an atmosphere of an inert gas such as argon or nitrogen, an inert gas atmosphere containing one or more kinds of gases such as hydrogen, a vacuum atmosphere, or a condition including one or more of these atmospheres.

In an exemplary embodiment, carbonization or graphitization may be conducted through a heat treatment, but it is not limited to the method by a heat treatment, and it may be conducted by methods such as microwave induced plasma or induction heating other than the heat treatment.

In an exemplary embodiment, the carbonization temperature in the heat treatment is more than 400° C. When the carbonization temperature is less than 400° C., carbonization hardly proceeds and a large amount of amorphous carbon is present, thus the electrical properties and the like of the carbon material may decrease. In addition, volatilization of carbon may occur when the carbonization temperature is too high, and it is thus preferable that the carbonization is conducted under the above-mentioned atmosphere conditions, for example, at a temperature of more than 400° C. and 3000° C. or less.

In addition, the carbonization may be conducted for, for example, from 20 minutes to 20 hours by introducing the polyolefin polymer of which the stabilization reaction has been induced into the carbonization furnace.

It is preferable that the carbonization step includes preferably at least a process (the first carbonization process) of carbonizing the polymer at a temperature of more than 400° C. and 1800° C. or less under the above-mentioned atmosphere conditions. A high-quality carbon material (graphene or the like) can be produced when the polymer is carbonized in such temperature range.

In addition, the carbonization step may further include a process (the second carbonization or graphitization process) of carbonizing the carbonized polymer at a temperature of from 1800° C. to 3000° C. under the above-mentioned atmosphere conditions. By the second carbonization process in such temperature range, the properties of the carbon material can be improved and high-quality graphitization can be achieved.

Hence, the carbonization step may include at least the first carbonization process to be conducted at a temperature of more than 400° C. and 1800° C. or less so as to prepare a high-quality carbon material, and it may further include the second carbonization process to be subsequently conducted at a temperature of from 1800° C. to 3000° C.

In addition, in an exemplary embodiment, in the carbonization step, the carbonization may be conducted while injecting a doping gas into the carbonization furnace in consideration of a wide range of application fields of the carbon material. The doping gas is not limited as long as it is for the surface modification of the carbon material. The doping gas may include ammonia gas and the like so that the surface of the carbon material is doped with, for example, nitrogen.

In addition, in the carbonization step, the carbonization may be conducted while injecting a carbon-containing gas into the carbonization furnace in order to enhance the properties of the carbon material. At this time, the carbon-containing gas is a gas containing carbon atoms in the molecule and may include, for example, hydrocarbon gases having from 1 to 5 carbon atoms ($C_1$ to $C_5$). As a specific example, one or more hydrocarbon gases selected from acetylene, ethylene, methane, or the like may be used as the carbon-containing gas.

The carbon material prepared by the method described above can have an excellent electrical conductivity and excellent heat dissipation properties when the carbon atoms have a carbon structure formed in a ring arrangement.

Figure 1B:
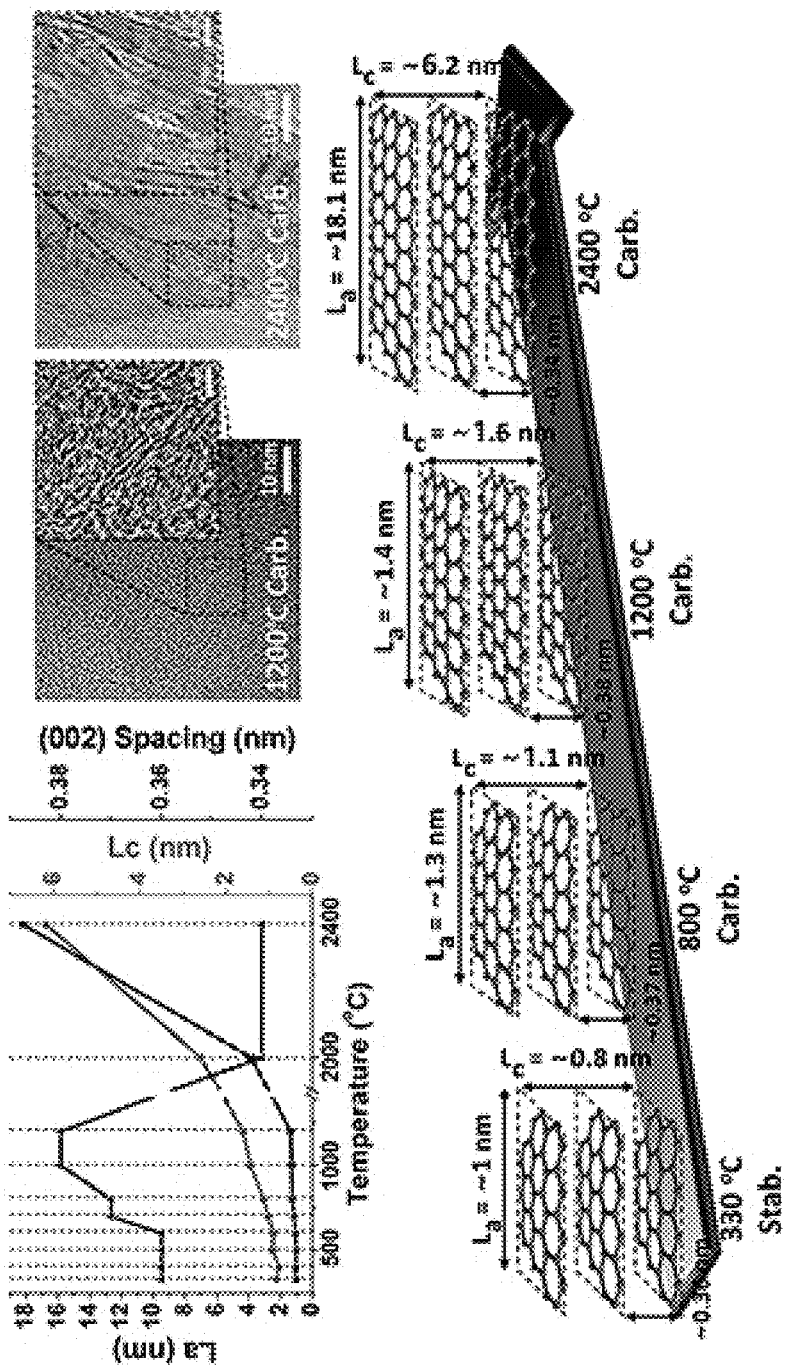
FIG. 1B is a schematic diagram illustrating the growth of a structure upon carbonization of LLDPE, which is a stabilized polyolefin, in an embodiment of the present invention.

FIG. 1B is a schematic diagram illustrating the growth of a structure upon carbonization of LLDPE, which is a stabilized polyolefin, in an embodiment of the present invention.

As illustrated in FIG. 1B, it can be seen that the basic structural unit is well developed by carbonization and graphitization via the stabilization according to embodiments of the present invention.

In an exemplary embodiment, the density of the carbon material may be from 1.6 to 2.1 $g/cm^3$, or from 1.6 to 1.9 $g/cm^3$, or from 1.75 to 1.9 $g/cm^3$. When the density of the carbon material is too low, the degree of carbonization decreases and the electrical conductivity properties are thus poor. For reference, the density of natural graphite is 2.2 $g/cm^3$.

In an exemplary embodiment, the electrical conductivity of the carbon material may be from 0.1 to 200 S/cm or from 40 to 200 S/cm.

In an exemplary embodiment, the sulfur content may be more than 0 and 2 at % (atomic %) or less or more than 0 and 1 at % (atomic %) or less in a case in which the carbon material contains or does not contain sulfur. It is preferable that the carbon material does not contain sulfur from the viewpoint of electrical conductivity. However, sulfur may remain in the above range in a case in which the sulfur treatment is conducted in the stabilization process as described above.

EXAMPLES

Hereinafter, specific Examples according to exemplary embodiments of the present invention will be described in more detail. However, it should be understood that the present invention is not limited to the following Examples, that various forms of Examples may be implemented within the scope of the appended claims, and that the following Examples are only intended to complete the disclosure of the present invention and to facilitate the practice of the present invention to those skilled in the art.

Example 1

Preparation of Polyolefin Polymer Powder or Film

Plastic gloves, envelopes, and packaging wraps of polyolefin (LLDPE) waste were used as raw materials. The waste was placed in a glass vessel containing toluene, heated at 100° C., and completely dissolved. A powder or film was precipitated at the bottom of the glass vessel containing the solution when the solution containing the polyolefin waste was cooled to room temperature. This was separated from the solution and dried to obtain a polyolefin-based plastic powder or film. The solvent after being separated can be reused. The remaining solvent was removed from the powder or film through drying.

Stabilization

In order to induce the stabilization reaction (crosslinking and cyclization of carbon atoms) of the polyolefin polymer, the polymer powder or film prepared was placed in an oven and then subjected to a heat treatment at from 235° C. to 330° C. for from 30 minutes to 2 hours in an air atmosphere. The rate of temperature rise in the heat treatment for stabilization was 5° C./min.

During the heat treatment process, the white powder or film gradually turned brown and eventually turned black.

Carbonization

The polyolefin polymer powder or film of which the stabilization reaction was induced was introduced into a carbonization furnace and carbonized. At this time, the temperature was raised to from 1000° C. to 2400° C. at a rate of 5° C./min in a gas atmosphere into which nitrogen was injected at a rate of 2000 sccm ($cm^3$/min) to prepare a carbon material.

Figure 2:
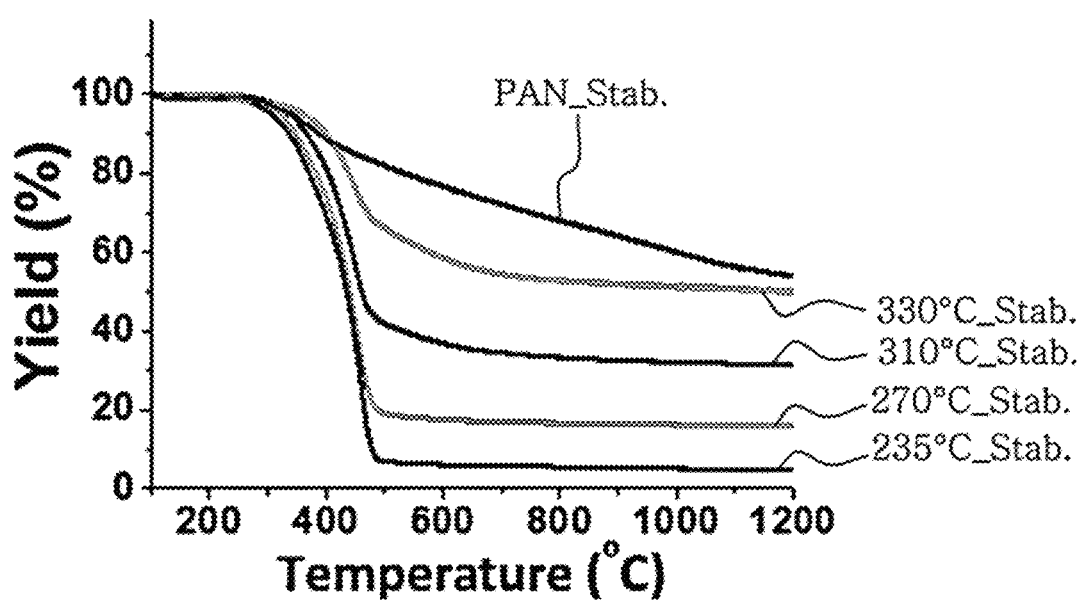
FIG. 2 is a graph illustrating the results of thermogravimetric analysis of stabilized polyolefin materials prepared according to Examples of the present invention.

The thermogravimetric analysis for the carbonization process of the stabilized polyolefin powder or film as described above was conducted, and the results are illustrated in the attached FIG. 2 as a graph.

FIG. 2 is a graph illustrating the results of thermogravimetric analysis of the stabilized polyolefin materials prepared according to Examples of the present invention.

As illustrated in FIG. 2, the yield after carbonization varied depending on the stabilization temperature, but the highest carbonization yield was 50% or more.

In other words, the thermally oxidized (stabilized) LLDPE film survived the high temperature process and was successfully carbonized. The carbonization yield increased from 4.5% to 50.0% when the oxidation temperature was raised from 235° C. to 330° C. This is similar to the value observed in a well-known reference carbon precursor, namely, PAN (up to 54%) used as a control group.

Figure 3:
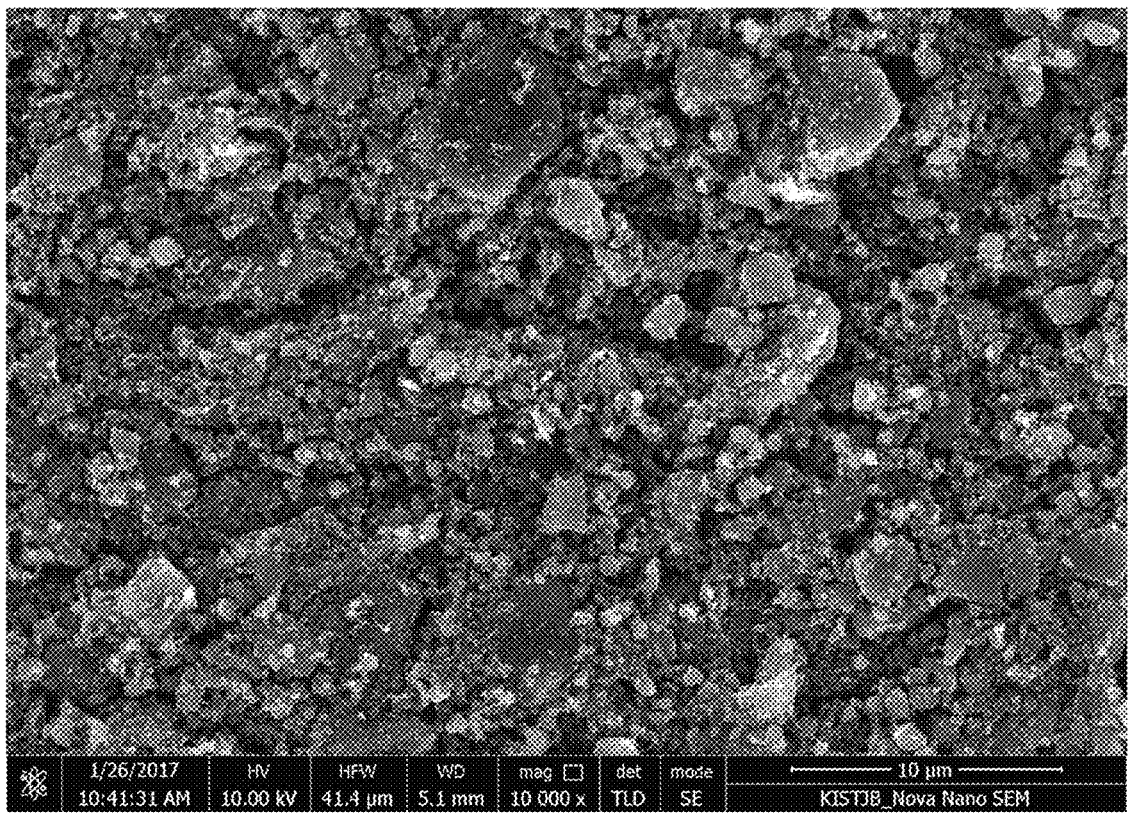
FIG. 3 is a scanning electron micrograph of carbon materials prepared at different carbonization temperatures according to Examples of the present invention.

Meanwhile, the structure of the carbon material prepared was observed under a scanning electron microscope and is illustrated in FIG. 3. FIG. 3 is a scanning electron micrograph of the carbon materials prepared at different carbonization temperatures according to Examples of the present invention.

As can be seen from FIG. 3, the size of the powder or film was not uniform and was in a range of approximately from 1 to 30 μm.

As the electrical conductivity, the carbon material powder prepared was pressed at a constant pressure of 500 kgf and then the electrical conductivity of the powder was measured. The results obtained by the 4-probe method are illustrated in the attached FIG. 4 as a graph.

Figure 4:
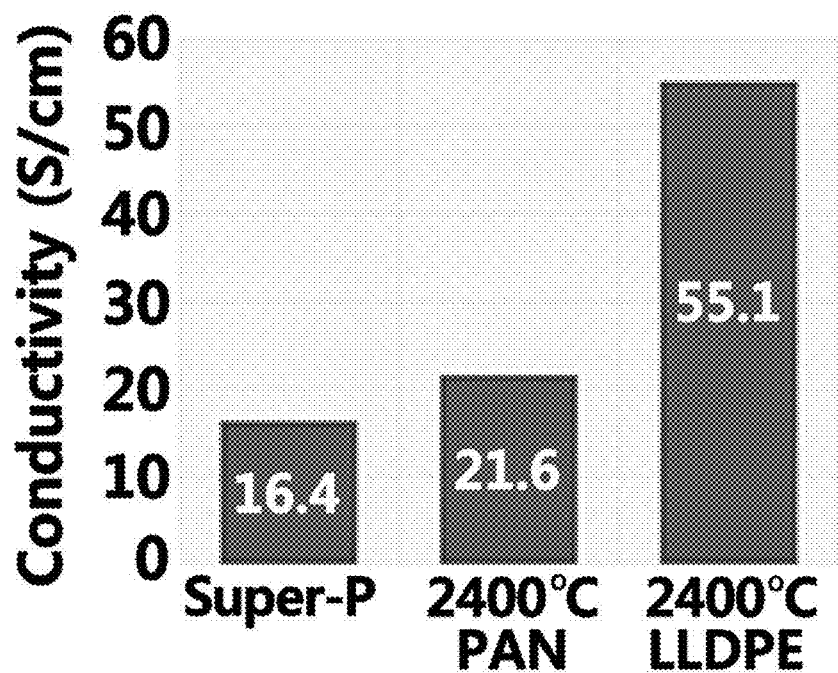
FIG. 4 illustrates the results obtained by comparing the electrical conductivities of the commercially available Super-p and a carbon material prepared by stabilizing a polyacrylonitrile polymer and then subjecting the stabilized polyacrylonitrile polymer to a heat treatment at 2400° C. with that of the carbon material prepared in Examples of the present invention.

FIG. 4 illustrates the results obtained by comparing the electrical conductivities of the commercially available Super-p and a carbon material prepared by stabilizing a polyacrylonitrile polymer and then subjecting the stabilized polyacrylonitrile polymer to a heat treatment at 2400° C. with that of the carbon material prepared in Examples of the present invention.

In the case of electrical conductivity, the electrical conductivity increases as the carbonization temperature is raised.

The electrical conductivity was measured after a polyacrylonitrile polymer commonly known as a precursor of a carbon material was stabilized and then subjected to a heat treatment at 2400° C. Surprisingly, the polyolefin-based plastic-based carbon material according to an embodiment of the present invention had a higher electrical conductivity than the carbon material prepared using a polyacrylonitrile polymer, as illustrated in FIG. 4.

The electrical conductivity of Super-p, which is a kind of high-conductivity carbon black to be widely used in commercial applications, is also illustrated for comparison of electrical conductivity.

In this c0ase as well, the polyolefin-based plastic-based carbon material prepared in an embodiment of the present invention had a higher electrical conductivity.

Moreover, it has been confirmed that the electrical conductivity of a waste polyolefin plastic-based carbon material prepared through carbonization at 1200° C. of a relatively low temperature is also higher than those of the polyacrylonitrile-based carbon material carbonized at a high temperature and Super-p.

Figure 5:
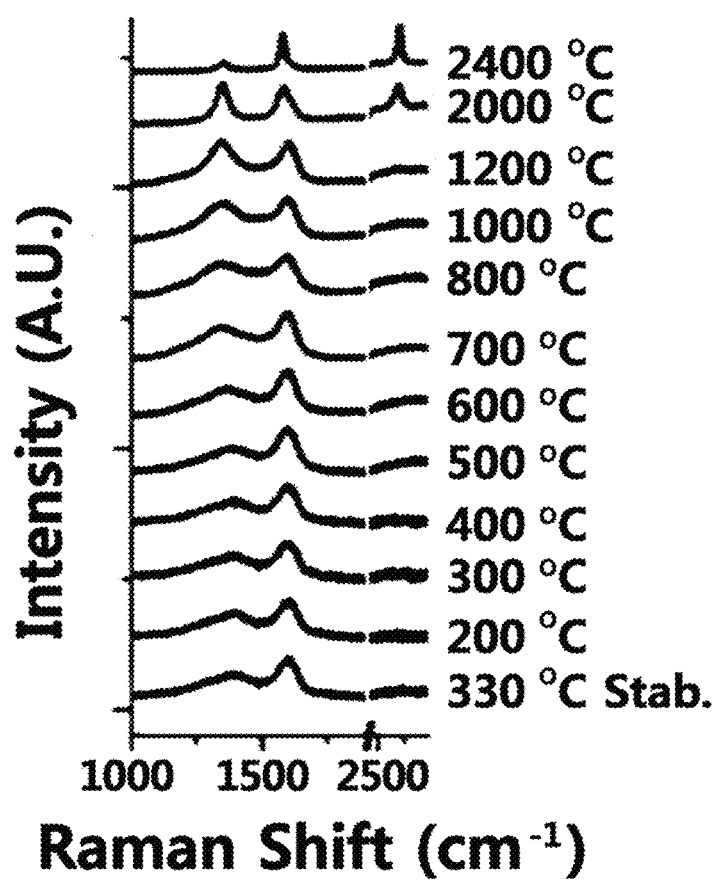
FIG. 5 is a graph illustrating the Raman spectrum analysis results of carbon materials prepared at different carbonization temperatures according to Examples of the present invention.

Meanwhile, the crystallinity was confirmed through Raman spectroscopic analysis, and the results of the analysis are illustrated in FIG. 5. FIG. 5 is a graph illustrating the Raman spectrum analysis results of the carbon materials prepared at different carbonization temperatures according to Examples of the present invention.

As a result of confirming the crystallinity through Raman spectroscopic analysis, the peaks of the G-band and D-band observed near 1600 $cm^{-1}$ were narrowed and heightened as the carbonization temperature was raised, as illustrated in FIG. 5.

Figure 6:
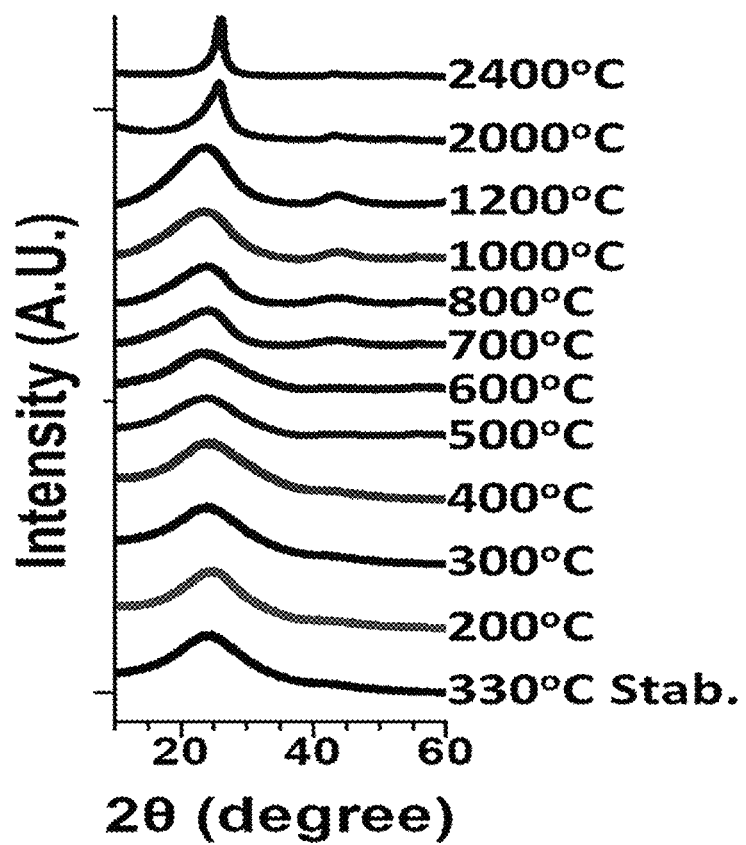
FIG. 6 is a graph illustrating the X-ray diffraction analysis results of carbon materials prepared at different carbonization temperatures according to Examples of the present invention.

The crystal structure of the carbon material was confirmed through X-ray diffraction. FIG. 6 is a graph illustrating the X-ray diffraction analysis results of the carbon materials prepared at different carbonization temperatures according to Examples of the present invention.

As can be seen from FIG. 6, a peak indicating the crystal face (002) was confirmed at around 25° C. and the peak shifted to the left and was narrowed and heightened as the heat treatment temperature was raised. The graphite structure growth by the heat treatment at 2400° C. was confirmed through this.

Figure 7:
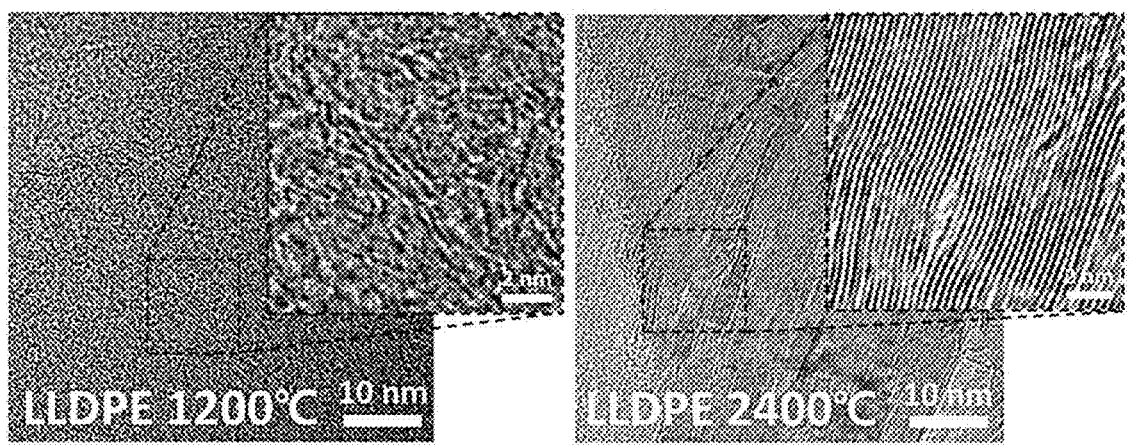
FIG. 7 is transmission electron micrographs of carbon materials prepared at different carbonization temperatures according to Examples of the present invention.

The nano-sized crystal structure of the carbon materials prepared at 1200° C. and 2400° C. was observed under a transmission electron microscope. FIG. 7 is transmission electron micrographs of the carbon materials prepared at different carbonization temperatures according to Examples of the present invention.

As illustrated in FIG. 7, it has been confirmed that when the heat treatment is conducted at 2400° C., the graphite structure layer is well developed, layered in several layers, and grown long. Polyolefin materials are a material which is hardly carbonized, but it has been confirmed that polyolefin materials are a material which can be graphitized in the case of being heat-treated via the treatments of embodiments of the present invention.

In order to demonstrate that upcycling of polyolefin materials is possible, LLDPE (as produced LLDPE film) [one prepared by pressing commercially available LLDPE in the granular form by using a press and forming the pressed LLDPE into a film], a waste poly glove (laboratory glove), and a cling wrap (commonly known as kitchen clean wrap) were heat-treated by the same method.

Figure 8A:
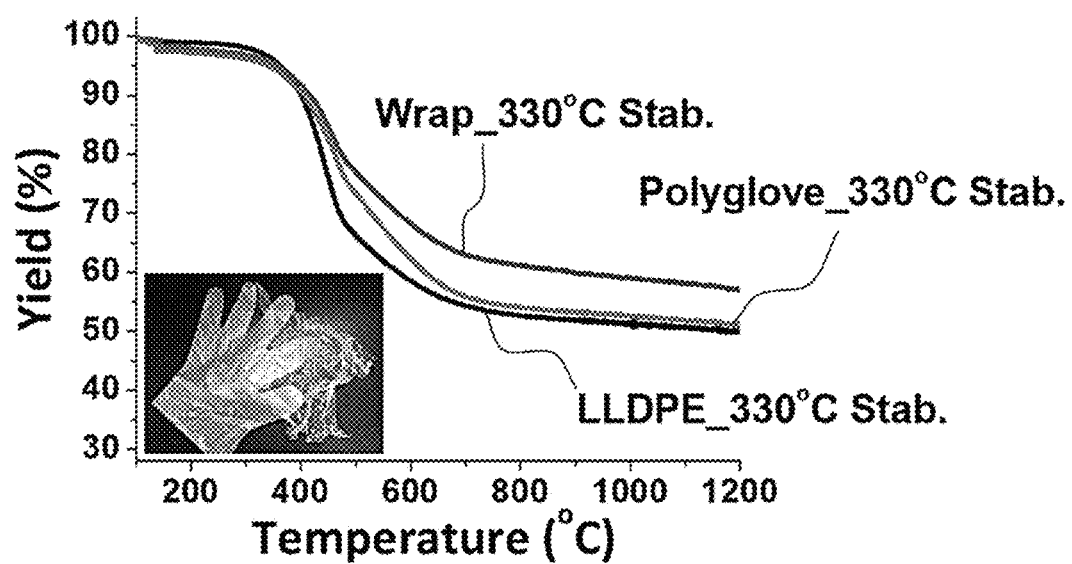
FIGS. 8A and 8B are TGA results (FIG. 8A) and Raman spectra (FIG. 8B) of a waste cling wrap, a waste poly glove, and a LLDPE film depending on the temperature after a thermal stabilization treatment at 330° C. in Examples of the present invention.
Figure 8B:
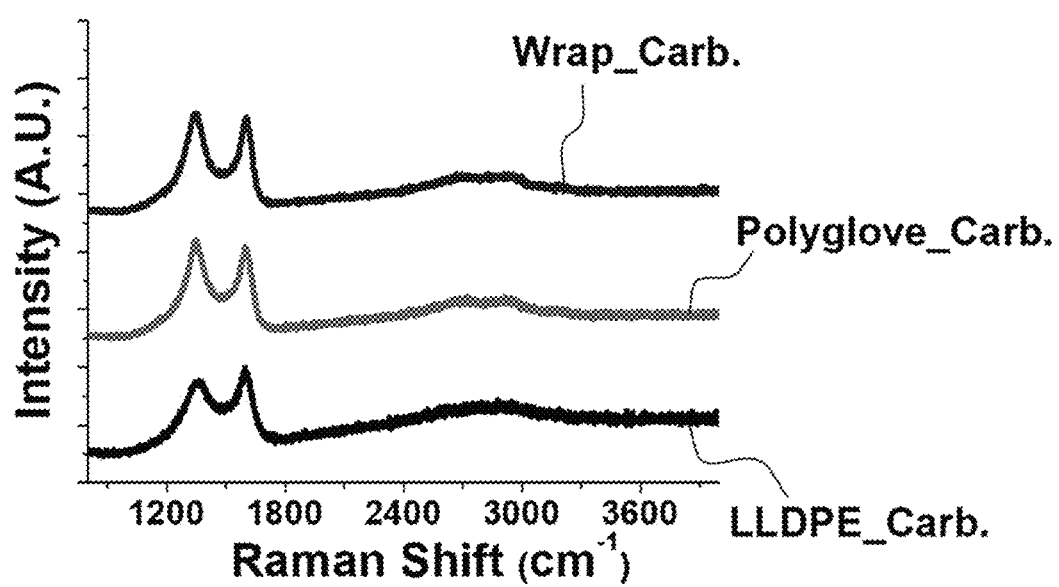

FIGS. 8A and 8B are TGA results (FIG. 8A) and Raman spectra (FIG. 8B) of a waste cling wrap, a waste poly glove, and a LLDPE film depending on the temperature after a thermal stabilization treatment at 330° C. in Examples of the present invention.

As can be seen from FIGS. 8A and 8B, a similar degree of carbonization yield and a similar structure were obtained from all of the three materials. For reference, additives are added depending on the properties of the product when generally manufacturing a product using LLDPE. For example, in order to attach the kitchen clean wrap to the glass or plastic bowls and in order to easily stretch the laboratory glove and easily put the hand in the laboratory glove, rubber, fine powder, and the like are added to each of the kitchen clean wrap and the laboratory glove or the surface thereof is treated with these additives. Despite the presence of these additives, there has been no problem when converting these materials into carbon materials, as can be seen from the above results.

Figure 9A:
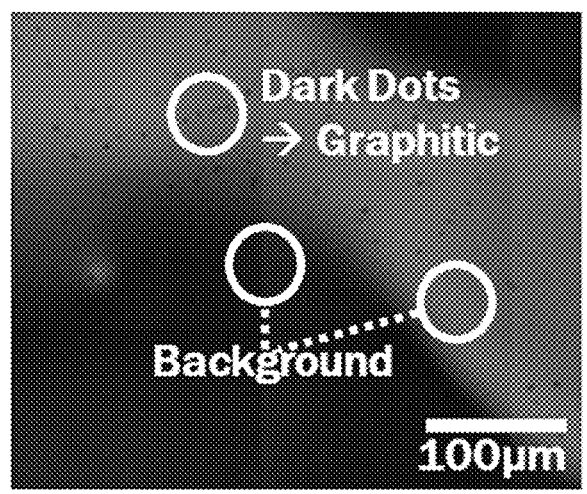
FIGS. 9A and 9B are a photomicrograph (FIG. 9A) of a waste cling wrap, a waste poly glove, and a LLDPE film after a thermal stabilization treatment at 330° C. and Raman spectra (FIG. 9B) of the observed respective parts thereof in Examples of the present invention.
Figure 9B:
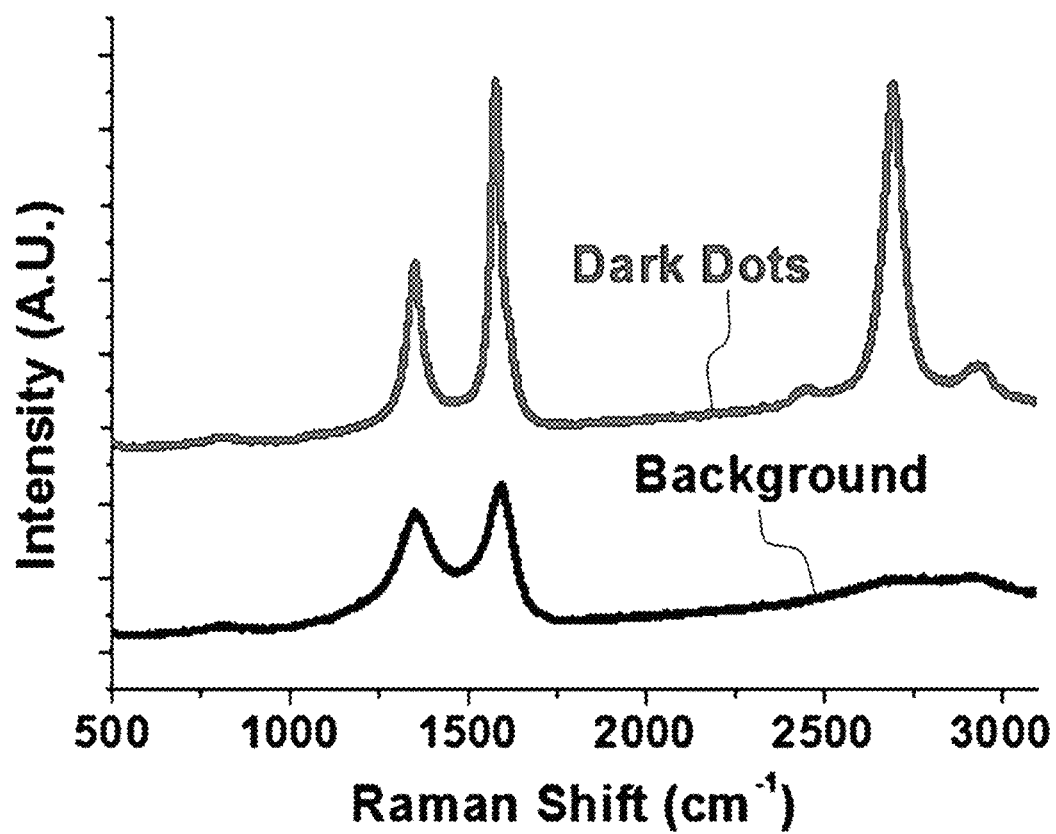

FIGS. 9A and 9B are a photomicrograph (FIG. 9A) of carbon materials prepared based on polyethylene according to Examples of the present invention and the measurement results (FIG. 9B) of the respective parts thereof by Raman spectroscopy.

As illustrated in FIG. 9A, it can be seen that black dots having a size of several micrometers are generated in the carbon material prepared based on polyethylene. The measurement results of the above black dots by Raman spectroscopy (FIG. 9B) shows that a strong 2D signal, which only appears in significantly crystalline graphite, is detected near 2700 cm$^{-1}$, and this indicates that the black dots generated in the polyethylene-based carbon material have a significantly crystalline carbon structure.

Figure 10:
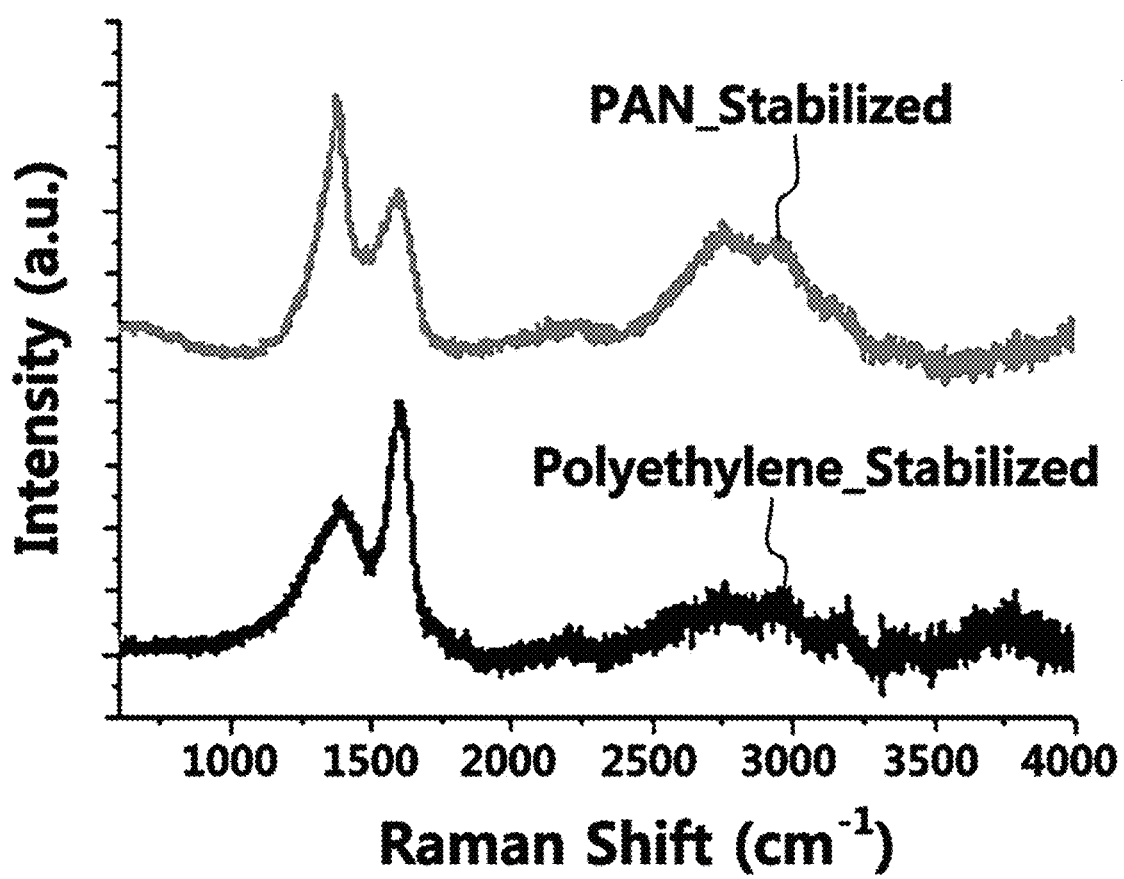
FIG. 10 is Raman spectra of samples obtained by subjecting a waste cling wrap, a waste poly glove, and a LLDPE film to a thermal stabilization treatment at 330° C. and a sample obtained by subjecting a PAN polymer to the thermal stabilization treatment in Examples of the present invention.

FIG. 10 is the measurement results by Raman spectroscopy of polyethylene and polyacrylonitrile samples which are respectively stabilized according to Examples of the present invention.

FIG. 10 suggests a cause of the development of the partial crystalline carbon structure illustrated in FIG. 9. The Raman spectra of the polyethylene and polyacrylonitrile samples subjected to the same stabilization conditions have been observed, and as a result, the size difference in the Raman band near 1400 cm$^{-1}$, which represents the degree of stabilization, namely, the degree of development of a hexagonal ring structure, have been confirmed. Based on this difference in Raman spectra, it can be concluded that when polyethylene is used as a precursor, the size of the basic structural unit (BSU), which is a hexagonal ring structure serving as a starting point of carbon structure development, is smaller than that of a polyacrylonitrile precursor. The ease of forming a crystalline carbon structure during the carbonization of a basic structural unit (BSU) having a small size is well known in existing literatures, and thus the formation of the previously identified small basic structural unit (BSU) is the cause of the formation of the crystalline carbon structure in the polyethylene-based carbon material.

Example 2

Preparation of Polyolefin Polymer Powder or Film
A polymer powder or film was prepared by the same method as in Example 1 above.
Stabilization
The polymer powder or film prepared was treated with sulfuric acid in order to induce the stabilization reaction (cyclization of carbon atoms) of the polymer. The treatment was conducted by a method in which the polymer powder or film was impregnated with an aqueous solution of sulfuric acid at from 90° C. to 150° C. for from 1 to 4 hours. By such impregnation with an acid solution, a chemical stabilization reaction of the polymer is induced and crosslinking thereof proceeds. Similar to the heat treatment method, the white polymer powder or film turned black after the stabilization.
Carbonization
The polymer powder or film of which the stabilization reaction was induced was introduced into a carbonization furnace and carbonized. At this time, the temperature was raised to from 1000° C. to 2400° C. at a rate of 5° C./min in a gas atmosphere into which nitrogen was injected at a rate of 2000 sccm (cm$^3$/min) to prepare a carbon material.

Example 3

Preparation of Polyolefin Polymer Powder or Film
A polymer powder or film was prepared by the same method as in Example 1 above.
Stabilization A heat treatment was conducted after electron beam irradiation in order to induce the stabilization reaction (cyclization of carbon atoms) of a polymer powder or film. Total energy was 2000 kGy and electron beam irradiation was conducted at room temperature. The polymer powder or film irradiated with an electron beam was further subjected to a heat treatment similar to that in Example 1. The heat treatment was conducted at a temperature of from 200° C. to 300° C. for from 10 minutes to 1 hour in an air atmosphere. The polymer powder or film was extremely pale yellow after being irradiated with an electron beam, but it was converted into a black powder or film through the additional heat treatment.
Carbonization
The polymer powder or film of which the stabilization reaction was induced was introduced into a carbonization furnace and carbonized. At this time, the temperature was raised to from 1000° C. to 2400° C. at a rate of 5° C./min in a gas atmosphere into which nitrogen was injected at a rate of 2000 sccm (cm$^3$/min) to prepare a carbon material.

Example 4

Preparation of Polyolefin Polymer Powder or Film
A polymer powder or film was prepared by the same method as in Example 1 above.
Stabilization
A sulfuric acid treatment was conducted after electron beam irradiation in order to induce the stabilization reaction (cyclization of carbon atoms) of a polymer powder or film. Total energy was 2000 kGy and electron beam irradiation was conducted at room temperature. The polymer powder or film irradiated with an electron beam was further subjected to a sulfuric acid treatment similar to that in Example 2. The treatment was conducted by a method in which the polymer powder or film was impregnated with an aqueous solution of sulfuric acid at from 80° C. to 120° C. for from 30 minutes to 2 hours. By such impregnation with an acid solution, a chemical stabilization reaction of the polymer is induced and crosslinking thereof proceeds. The polymer powder or film was extremely pale yellow after being irradiated with an electron beam, but it was converted into a black powder or film through the additional treatment.
Carbonization
The polymer powder or film of which the stabilization reaction was induced was introduced into a carbonization furnace and carbonized. At this time, the temperature was raised to from 1000° C. to 2400° C. at a rate of 5° C./min in a gas atmosphere into which nitrogen was injected at a rate of 2000 sccm (cm$^3$/min) to prepare a carbon material.

The electrical conductivity of the carbon materials prepared according to each of Examples 1 to 4 at each heat treatment temperature was evaluated by the same method as in Example 1, and the results are presented in the following Table 1. In the following Table 1, the unit is S/cm.

TABLE 1

| | Heat treatment temperature | | | |
| --- | --- | --- | --- | --- |
| | 1000° C. | 1200° C. | 1600° C. | 2400° C. |
| Example 1 | 20.3 | 31.8 | 37.2 | 55.1 |
| Example 2 | 6.4 | 10.5 | 12.9 | 20.7 |
| Example 3 | 24.9 | 35.6 | 41.6 | 59.7 |
| Example 4 | 10.2 | 13.7 | 16.4 | 27.5 |

As described above, it is possible to prepare a material having a carbon or graphite structure having a hexagonal ring structure by inducing a stabilization reaction by various methods before a polyolefin-based plastic is carbonized.

Particularly, it is generally known that the chains of a polyolefin polymer are cleaved and the polyolefin polymer is decomposed and loses its performance in a case in which heat is applied to the polyolefin polymer or the polyolefin polymer is irradiated with an electron beam and exposed to sulfuric acid. However, according to embodiments of the present invention, it is possible to prepare a carbon material via the three stabilization processes or a stabilization process of a combination thereof. Hence, it can be seen that polyolefin-based plastics, particularly polyolefin-based waste plastics which are discarded as waste, can be converted into a carbon material having high added value and an excellent electrical conductivity.

As in embodiments of the present invention, there are one or more of the following advantages in the case of using polyolefin-based plastics, particularly polyolefin-based waste plastics as a raw material. In other words, according to exemplary embodiments of the present invention, the present invention is an environmentally friendly technology in that waste including household polyolefin-based materials such as cling wraps and poly gloves, which are mostly landfilled, is used. In addition, the proportion of the cost of raw materials is significantly low in the preparation technology since waste is used, and thus the manufacturing cost can be lowered. In addition, it can be said that the present invention is an upcycling technology that goes beyond conventional recycling since the carbon material prepared has a comparative advantage over the carbon materials to be currently used in terms of performance as it has a high carbonization yield and a significantly high electrical conductivity.

What is claimed is:

1. A method for preparing a carbon material comprising:
dissolving waste polyolefin-based plastic in a solvent followed by a precipitation to provide a precipitated polyolefin-based polymer in the form of a powder or a film;
stabilizing the precipitated polyolefin-based polymer with an exposure to an electron beam to provide a crosslinked polyolefin-based polymer, wherein the stabilizing consists of the exposing the precipitated polyolefin to the electron beam in the absence of any acid treatment; followed by subjecting the stabilized polyolefin-based polymer to a thermal treatment in an air or oxygen atmosphere at a temperature in a range of 130° C. to 400° C., or a thermal treatment under vacuum at a temperature in a range of 130° C. to 350° C.; and
carbonize the stabilized crosslinked polyolefin-based polymer, at a temperature of more than 400° C. and less than 1800° C.

2. The method for preparing a carbon material according to claim 1, wherein the method for preparing a carbon material is a non-catalytic process.

3. The method for preparing a carbon material according to claim 1, wherein the polyolefin-based polymer includes one or more of a linear low-density polyolefin (LLDPE), a low-density polyolefin (LDPE), a medium-density polyolefin (MDPE), a high-density polyolefin (HDPE), an ultra high molecular weight polyolefin (UHMWPE), or a crosslinked polyolefin (XLPE).

4. The method for preparing a carbon material according to claim 1, wherein the solvent is an aromatic hydrocarbon solvent.

5. The method for preparing a carbon material according to claim 4, wherein the solvent is at least one of toluene, xylene, dichlorobenzene, or trichlorobenzene.

6. The method for preparing a carbon material according to claim 1, wherein the powder is further processed into a form of a film and then subjected to the stabilization.

7. The method for preparing a carbon material according to claim 1, wherein the dissolving of the waste polyolefin in the solvent includes the addition of a crosslinking agent.

8. The method for preparing a carbon material according to claim 7, wherein the crosslinking agent is butyl 4,4-bis(tert-butyldioxy)valerate, di-(2,4-dichlorobenzoyl)-peroxide, dibenzoyl peroxide, tert-butyl peroxybenzoate, 1,1-di-(tert-butylperoxy)-3,3,5-trimethylcyclohexane, dicumyl peroxide, di-(2-tert-butylperoxyisopropyl)-benzene, tert-butyl cumyl peroxide, 2,5-dimethyl-2,5-di-(tert-butylperoxy)-hexane, di-tert-butylperoxide, 2,5-dimethyl-2,5-di(tert-butylperoxy)hexyme-3 or a combination thereof.

9. The method for preparing a carbon material according to claim 1, wherein the stabilizing consists of the exposing the precipitated polyolefin to the electron beam followed by the thermal treatment in an air or oxygen atmosphere at a temperature in a range of 200° C. to 300° C.

10. The method for preparing a carbon material according to claim 9, wherein the electron beam irradiation is conducted with a total energy from 50 kGy to 3000 kGy.

11. The method for preparing a carbon material according to claim 1, wherein the carbonization of the stabilized crosslinked polyolefin-based polymer is conducted in an inert gas atmosphere or a vacuum atmosphere, and at a temperature of more than 400° C. and less than 1800° C.

12. The method for preparing a carbon material according to claim 11, further comprising graphitizing the carbonized powder or film at a temperature of from 1800° C. to 3000° C.

* * * * *